United States Patent
Slik

(10) Patent No.: US 8,700,806 B1
(45) Date of Patent: Apr. 15, 2014

(54) MODULAR SERVICE LEVEL OBJECTIVE (SLO) SUBSYSTEM FOR A NETWORK STORAGE SYSTEM

(75) Inventor: David Slik, Burnaby (CA)

(73) Assignee: NetApp, Inc., Sunnyvale, CA (US)

( * ) Notice: Subject to any disclaimer, the term of this patent is extended or adjusted under 35 U.S.C. 154(b) by 68 days.

(21) Appl. No.: 13/033,531

(22) Filed: Feb. 23, 2011

(51) Int. Cl.
*G06F 15/173* (2006.01)

(52) U.S. Cl.
USPC ............ 709/249; 709/220; 709/221; 709/222

(58) Field of Classification Search
USPC .......................................... 709/249, 220–223
See application file for complete search history.

(56) References Cited

U.S. PATENT DOCUMENTS

| | | |
|---|---|---|
| 7,693,877 B1 | 4/2010 | Zasman |
| 7,778,981 B2 | 8/2010 | Armitano et al. |
| 8,176,180 B2 * | 5/2012 | He et al. ........................ 709/226 |
| 2004/0243699 A1 * | 12/2004 | Koclanes et al. ............. 709/224 |
| 2006/0236061 A1 * | 10/2006 | Koclanes ...................... 711/170 |
| 2008/0126404 A1 | 5/2008 | Slik et al. |
| 2008/0301255 A1 * | 12/2008 | He et al. ........................ 709/214 |
| 2010/0186963 A1 | 7/2010 | Butcher et al. |

OTHER PUBLICATIONS

"Hill Climbing," downloaded on Jan. 21, 2011 (6 pages).

* cited by examiner

*Primary Examiner* — Kenneth Coulter
(74) *Attorney, Agent, or Firm* — Perkins Coie LLP

(57) ABSTRACT

A service level objective (SLO) subsystem that includes an SLO engine in a network storage system that allows new degrees of freedom to be added to the SLO subsystem, without requiring any modification of an associated SLO engine or the system's existing SLOs, and without requiring the SLO engine to have any a priori knowledge of the new degrees of freedom. In certain embodiments, the system has a modular design which includes the SLO engine and one or more SLO modules that interface with the SLO engine. Each SLO module corresponds to a different degree of freedom. Each SLO module evaluates SLO compliance and determines what specific action(s) within its corresponding degree of freedom should be taken to comply with an SLO.

28 Claims, 8 Drawing Sheets

MODULAR SERVICE LEVEL OBJECTIVE (SLO) SUBSYSTEM FOR A NETWORK STORAGE SYSTEM

FIELD OF THE INVENTION

At least one embodiment of the present invention pertains to network storage systems, and more particularly, to a modular service level objective (SLO) subsystem for a network storage system.

BACKGROUND

Network storage is a common technique for making large amounts of data accessible to multiple users, archiving data, and other purposes. In a network storage environment, a storage server on a network makes data available to client (host) systems by presenting or exporting to the clients one or more logical containers of data. There are various forms of network storage, including, for example, network attached storage (NAS) and storage area network (SAN). In a NAS system, a storage server services file-level requests from clients, whereas in a SAN a storage server services block-level requests. Some storage servers are capable of servicing both file-level requests and block-level requests.

In a large-scale network storage system, such as used in many large business enterprises, it is often crucial to maintain a consistently high level of performance (throughput, efficiency, etc.). Toward that end, some network storage systems use one or more service level objectives (SLOs) to help evaluate and maintain an adequate level performance. An SLO is a set of one or more values relating to one or more specific measurable performance characteristics ("SLO characteristics"), and specifying one or more desired or required levels of service to be provided to an application or a set of applications. Common SLO characteristics are, for example, latency, cost, protection against local failures or corruption, geographic dispersion, efficiency, throughput, etc. An SLO, therefore, can be defined in terms of any one or more of these characteristics, and other characteristics. By monitoring a system's actual performance relative to an SLO, it can be determined whether the system is performing adequately, and adjustments to the state of the system can be made if it is not.

A given SLO characteristic can be used to control one or more "degrees of freedom" in a storage system. A degree of freedom is, in this context, a high-level type or category of operation, task or configuration state that can be performed in or by a storage system, such as data replication or data placement. Compliance with a given SLO characteristic can be measured, and system state (e.g., data layout) can be adjusted for any of various different degrees of freedom. For example, additional copies of data can be created (replication) and/or data can be moved from one storage tier to another (data placement) to achieve compliance with a specified SLO. The particular degrees of freedom that are available in a given storage system are implementation-specific.

At least one conventional network storage system includes a software-implemented SLO engine that measures the system's compliance with SLOs and makes or controls adjustments to system state as needed, in one or more degrees of freedom, to achieve better SLO compliance. For example, the SLO engine might create additional copies of data and/or move data around to achieve compliance with a specified SLO. However, the SLO engine is "hard-coded" with knowledge of the degrees of freedom that the storage system has, and therefore it has the ability to modify system state in only those particular degrees of freedom. Consequently, the SLO engine is very inflexible. Hence, if a new degree of freedom (e.g., data compression capability) were to be added to the storage system, the SLO engine could not determine how adjustments in that degree of freedom might affect compliance with the SLO or affect operations in other degrees of freedom. In order to do so, the SLO engine would have to be either replaced with a more capable SLO engine that has such knowledge/capability, or it would have to be taken off-line and updated in place to add such capability. Either of these scenarios would involve at least some inconvenience to users of the system, and potentially a disruption of system operation. In a large-scale storage system that stores mission-critical data, even minimal down time can be extremely disruptive to users and the overall business that the system supports.

SUMMARY

The SLO subsystem and associated technique introduced here allow new degrees of freedom to be added to an SLO subsystem in a network storage system, without requiring any modification of the associated SLO engine or the system's existing SLOs, and without requiring the SLO engine to have any a priori knowledge of the new degrees of freedom. In certain embodiments, the system has a modular design which includes the SLO engine and one or more SLO modules that interface with the SLO engine. The SLO modules are functionally distinct from each other in that each SLO module corresponds to a different degree of freedom (e.g., data mirroring, data replication, data placement, data compression). In general, each SLO module evaluates SLO compliance and determines what specific action(s) within its corresponding degree of freedom should be taken to comply with an SLO.

Each SLO module is defined for a specific degree of freedom, independently of any SLO, and has no a priori knowledge of the system's SLOs or the specific functionality of the SLO engine. Similarly, the SLO engine is designed independently of any degree of freedom, and in that sense it is completely agnostic toward the SLO modules. The SLO engine includes an interface with the SLO modules, which is designed so that new SLO modules of essentially any number and essentially any degrees of freedom can be plugged into (operatively coupled with) the SLO engine to modify or increase its capability, without any need to modify the SLO engine itself or the actual SLOs. The interface provides for uniform communications between the SLO engine and the SLO modules, so that each SLO module only needs to be designed to comply with that interface in order to be compatible with the SLO engine.

In certain embodiments, the SLO engine provides to each SLO module at least one input layout, including an indication of the storage system's current layout ("layout" is defined below), the storage system's current topology, and a desired SLO for the storage system. The desired SLO may be expressed as a vector that includes desired values for multiple SLO characteristics. Based on this information, each SLO module evaluates a function that represents a relationship between an SLO characteristic and the degree of freedom that the SLO module handles, to determine at least one proposed layout, as well as a corresponding SLO value that would result from each proposed layout and an indication of the resulting change in the SLO value (if any) for the proposed layout relative to the desired SLO. This output set is then provided by the SLO module to the SLO engine.

Upon receiving an output set from each of the SLO modules, the SLO engine ranks the output sets by (at least in part) the SLOs of their proposed layouts. If the SLO value in at least one of the output sets complies with (meets or exceeds)

the corresponding desired SLO value, the SLO engine can select one of those output sets and apply the proposed layout that it included to the storage system. If no output set complies with the SLO, the above-mentioned process can be iterated one or more additional times, wherein the best proposed layout or layouts from the previous iteration is/are used as input to the various SLO modules, in order to converge towards a layout solution that complies with the desired SLO value. Optionally, even if one more proposed layouts do comply with the desired SLO value, the technique can be performed iteratively to find a layout that is more optimal across multiple degrees of freedom.

Other aspects of the technique will be apparent from the accompanying figures and detailed description. This summary is provided to introduce in a simplified form certain concepts that are further described in the Detailed Description below and the drawings. This summary is not intended to identify essential features of the claimed subject matter or to limit the scope of the claimed subject matter.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
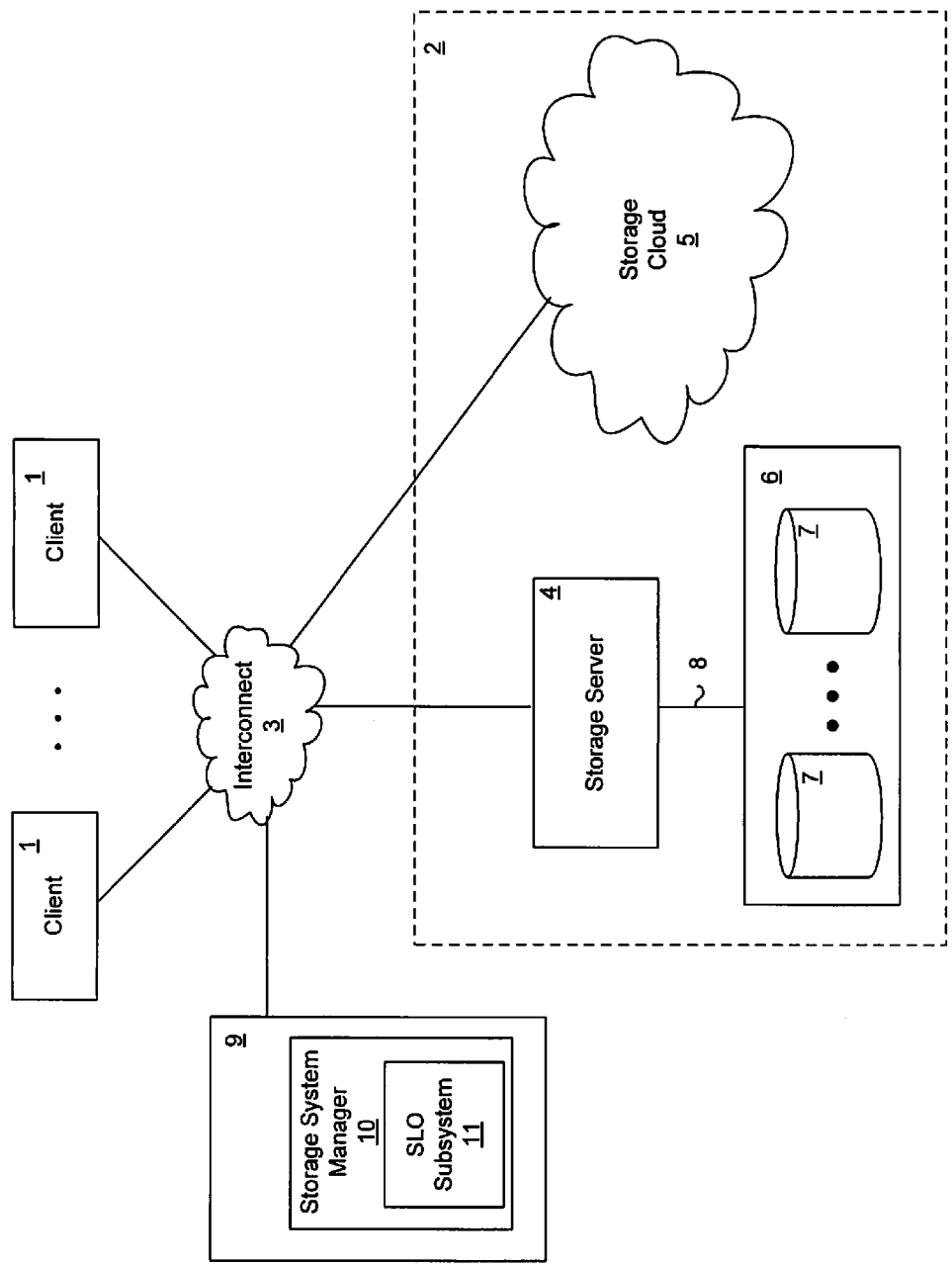
FIG. 1 illustrates an example of a network data storage environment that includes an SLO subsystem.

FIG. 1 shows an example of a network data storage environment in which the system and techniques introduced here can be implemented. The illustrated environment includes various client systems 1 connected to a data storage system 2 via an interconnect 3. The data storage system 2 includes a storage server 4, and one or more other storage servers and/or other devices collectively represented as a storage "cloud" 5, all coupled to the interconnect 3. The storage server 4 provides the client systems 1 with access (e.g., read and write access) to at least one mass storage subsystem 6 that contains one or more mass storage devices 7, such as disks, flash memory, solid-state drives (SSDs), tape storage, etc. The storage cloud 5 may include one or more similar or different tiers of storage, each of which can contain one or more storage servers and mass storage devices, and potentially other types of devices.

The storage server 4 can be, for example, a SAN-oriented or NAS-oriented storage server, or a storage server which has both SAN and NAS functionality. The interconnect 3 can be, for example, a packet-switched network, such as a local area network (LAN), a wide area network (WAN), or an internetwork such as the Internet. Further, the connection 8 between the storage server 4 and the mass storage subsystem 6 can be a switching fabric, such as a series of SAS/SATA interfaces. It is noted that within the illustrated network storage environment, any other suitable numbers of client systems, storage servers and/or mass storage devices, and/or any other suitable network technologies, can be employed.

The storage server 4 can make some or all of the storage space in the mass storage subsystem 6 available to the client systems 1 in a conventional manner. For example, each of the storage devices 7 can be accessed individually or at least some of this can be accessed as a group, such as redundant array of independent devices (RAID) group. The storage server 4 can communicate with the client systems 1 according to the various well-known protocols, such as the Network File System (NFS) protocol, the Common Internet File System (CIFS) protocol and/or the Cloud Data Management Interface (CDMI) protocol, to make data stored on the mass storage devices 7 available to users and/or application programs. The storage server 4 may create and maintain a file system to organize and manage data stored on the storage devices 6 and can present or export that data to one or more of the client systems 1.

A management station 9 is also coupled to the interconnect 3. The management station 9 includes a storage system manager 10, using which a human storage administrator can control various operations and settings of the data storage system 2. These operations may include, for example, provisioning storage resources, configuring and scheduling backup operations, specifying SLOs, etc. The storage system manager 10 includes an SLO subsystem 11, described further below, to evaluate SLO compliance and modify system state, when appropriate, to achieve and maintain SLO compliance. In one embodiment the storage manager 10 including the SLO subsystem 11 are implemented as programmable circuitry that is programmed and/or configured to perform the operations described herein. In another embodiment these components are implemented wholly or partially as special-purpose hardware circuitry.

Figure 2:
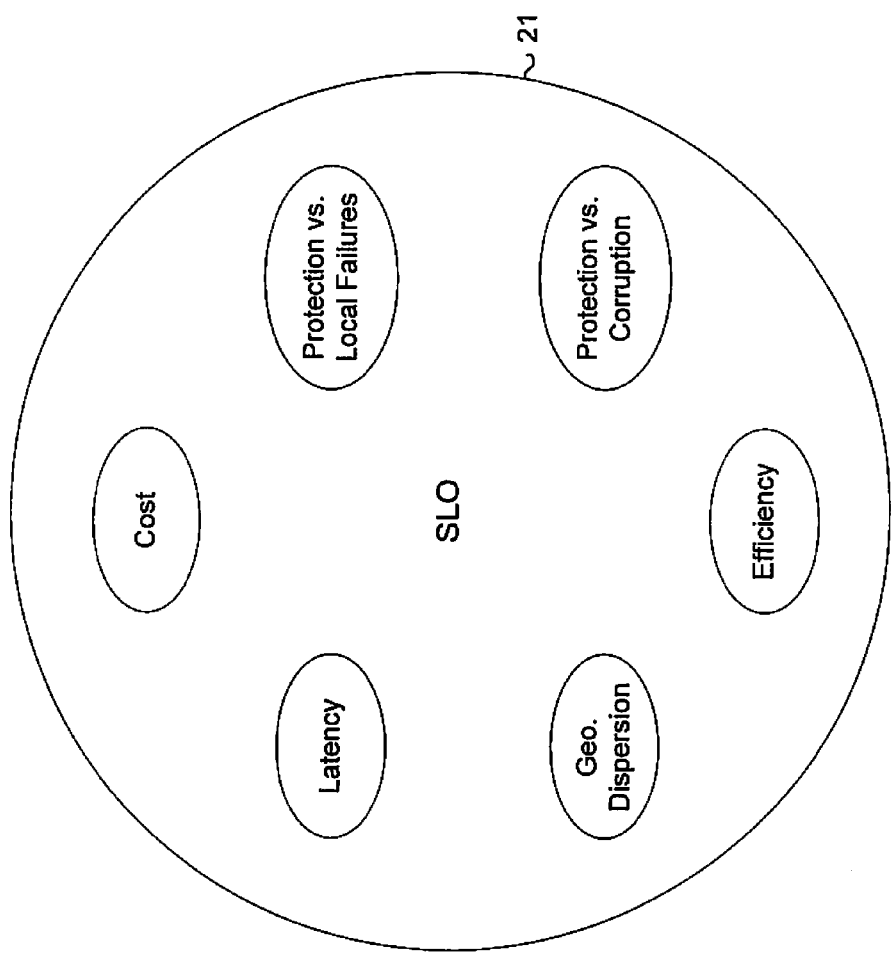
FIG. 2 conceptually illustrates an example of an SLO that includes multiple SLO characteristics.

As illustrated in FIG. 2, a given SLO 21 can have one or more SLO characteristics, which can include, for example, latency, cost, efficiency, protection against local failures, protection against corruption and/or geographic dispersion. An SLO, therefore, can be represented as a vector of values, each of which corresponds to a different SLO characteristic. SLO values can be computed in any known or convenient manner and can be defined to be within any convenient range. For example, SLO values can be defined within a range of 0 to 100.

Figure 3:
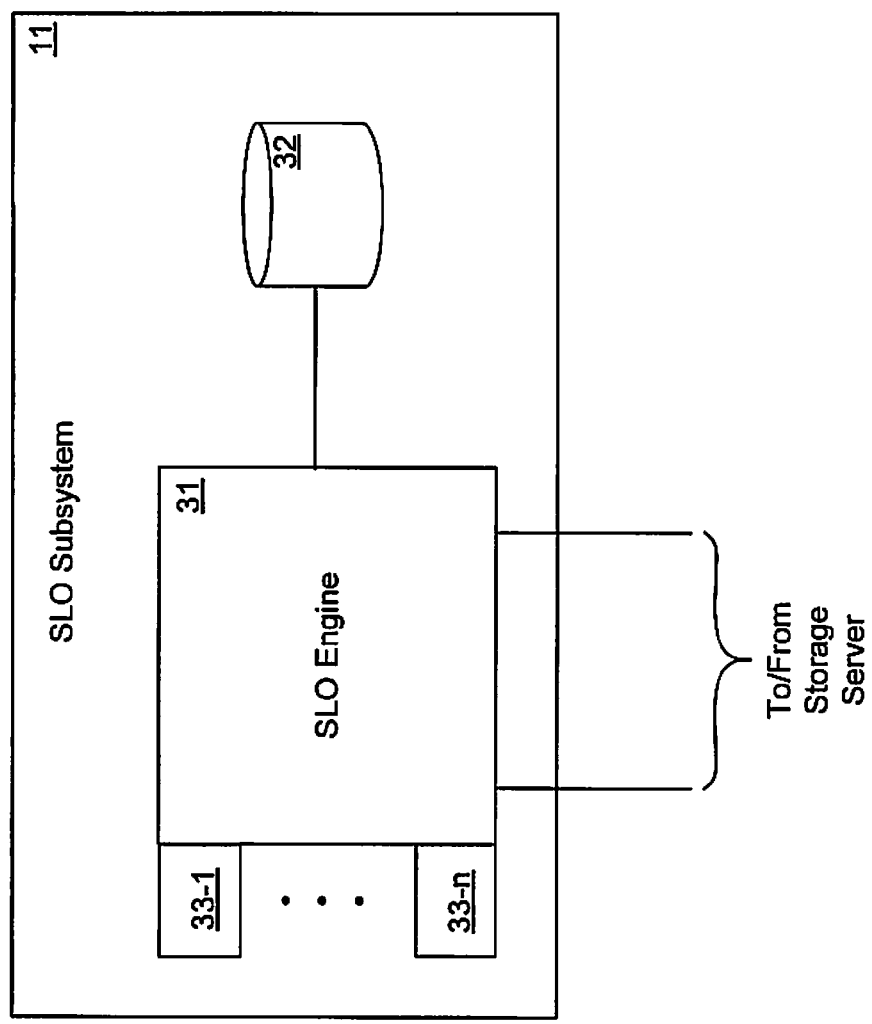
FIG. 3 illustrates an example of the SLO subsystem.

FIG. 3 illustrates the SLO subsystem 11 according to one embodiment. As illustrated the SLO subsystem 11 includes an SLO engine 31, an SLO database 32, and one or more SLO modules 33-1 . . . 33-n (collectively "SLO modules 33"). The SLO database 32 contains data defining one or more desired SLOs, which can be user-specified (e.g., by a storage administrator). Each SLO module 33 corresponds to a different degree of freedom (e.g., data replication, data placement, data compression) and contains different internal logic. In general, each SLO module 33 evaluates SLO compliance in the data storage system and determines what specific action(s) within its corresponding degree of freedom should be taken, if any, to comply with an SLO. The SLO modules 33 can include, for example, any one or more of the following:

a data mirroring module to control data mirroring in relation to a specified SLO;

a data placement module to control data placement in relation to a specified SLO;

a namespace placement module to control data access in relation to a specified SLO;

a data replication module to control data replication in relation to a specified SLO;

a data caching module to control data caching in relation to a specified SLO;

a data transformation module to control data transformation, such as encryption and/or compression, in relation to a specified SLO;

a data dispersion module to control geographic dispersion of data in relation to a specified SLO.

Each SLO module 33 is defined for a specific degree of freedom independently of any specific SLO and has no a priori knowledge of the desired SLOs or the specific functionality of the SLO engine 31. Similarly, the SLO engine 31 is designed independently of any degree of freedom, and in that sense is completely agnostic toward the SLO modules 33. Each SLO module 33 communicates with the SLO engine 31 via an interface in the SLO engine 31 that provides for uniform communication between the SLO engine 31 and each SLO module 33.

In certain embodiments, the SLO engine 31 provides to each SLO module 33 an indication of the data storage system's current "layout", the data storage system's current topology and a desired SLO value of the storage system. The current topology can include the number, types, characteristics and operational state of storage tiers and devices in the system and their interconnections. The "layout" of the data storage system can be thought of set of choices of the degrees of freedom that are applicable to the data storage system. As such, the layout can be expressed in terms of multiple characteristics, such as degree of replication of data objects, placement of replicas, transformation of replicas, placement of namespace, etc. The desired SLO may be expressed as a vector that includes desired SLO values for multiple SLO characteristics (e.g., latency, cost, geographic dispersion, etc.). The current topology indication can be expressed in any convenient format.

Each SLO module 33 applies a mathematical function (or multiple mathematical functions) representing a relationship between a desired SLO characteristic, an input layout and the degree of freedom that the SLO module handles, to determine at least one proposed layout, a corresponding SLO value that would result from that proposed layout, an indication of the resulting change in the SLO value (if any) relative to the desired SLO value. This process is now discussed further with reference to FIGS. 4A through 4C.

Figure 4A:
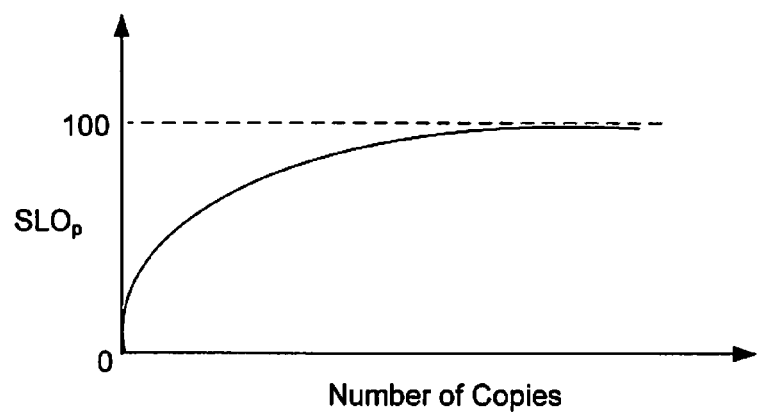
FIGS. 4A, 4B and 4C are examples of curves representing functions that can be applied by an SLO module in the SLO subsystem.
Figure 4B:
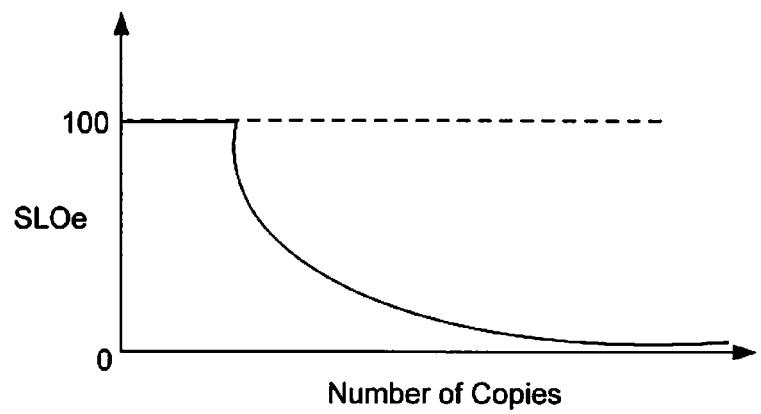
Figure 4C:
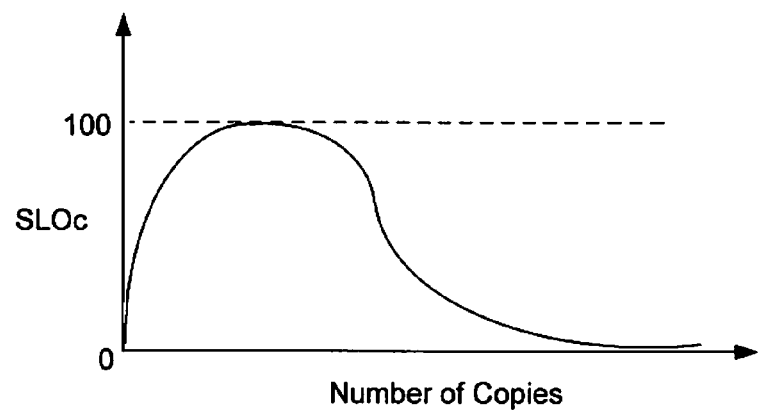

FIGS. 4A through 4C illustrate three functions relating to a data replication SLO module, although similar functions could be used for other types of SLO modules. Each SLO module 33 can evaluate one or more SLO characteristics in relation to the degree of freedom for which it is designed. For this example, assume that the data replication SLO module can evaluate two SLO characteristics, data protection and efficiency, relative to the layout characteristic that is relevant to the data replication degree of freedom, which in this example is number of copies of a data object or data set. Note, however, that a given SLO module can evaluate and generate output for as few as one SLO characteristic, or for any other number of SLO characteristics. It is also assumed for this example that each SLO characteristic can have a value in the range of 0 to 100, although any convenient range can be used.

The illustrative function in FIG. 4A reflects the relationship between the number of copies of any given data object or data set and the degree of data protection, $SLO_P$. In particular, the degree of data protection tends to rise quickly as the number of copies increases from zero, but then quickly levels off, asymptotically approaching 100%. The illustrated function mathematically reflects the principle that after a certain point, increasing the number of copies of a given data object or set of data objects tend to produce diminishing returns in data protection.

The illustrative function in FIG. 4B reflects the relationship between the number of copies of any given data object or set of data objects and the degree of storage efficiency, $SLO_e$. In particular, the degree of efficiency is at its maximum when the number of copies is very small, and then begins to decay exponentially as the number of copies increases from some small non-zero number. The illustrated function mathematically reflects the principle that the efficiency of the storage system is minimally affected by making up to a certain small number of copies, but then begins to rapidly decrease as the number of copies is increased beyond that point.

When an SLO module is designed to evaluate two or more SLO characteristics, as in the replication example described above, the SLO module may generate a separate output array for each SLO characteristic that it evaluates, or it may implement a single function and generate a single output that represents the composite effect of multiple functions that it represents. An example of the latter approach is illustrated in FIG. 4C, which shows a function representing a weighted combination of the functions of FIGS. 4A and 4B. For example, a composite SLO value, $SLO_c$, represented by the curve of FIG. 4C, might be computed as $SLO_c = W_p * SLO_p + W_e * SLO_e$, where $W_p$ and $W_e$ are the weight values for data protection and efficiency, respectively. The particular weighting used is implementation-specific and can be chosen by the SLO module designer or a storage administrator. Therefore, for any given input layout characteristic (e.g., number of copies in this example), the replication SLO module can output a separate SLO value for each SLO characteristic that it evaluates and/or it can output a composite SLO value collectively corresponding to all of the SLO characteristics that it evaluates. The same is true for any other SLO module.

The specific details of the function(s) used by each SLO module 33 to evaluate an SLO characteristic can be determined empirically by the SLO module designer, for example, or computed algorithmically based on collected system traces or workloads. The functions may be based on a table of values, an internal model simulating the storage systems, or other standard methods by which to relate the input values to the output values.

After computing an SLO value for a given input layout (by using its internal function(s) as described above), an SLO module 33 temporarily stores that SLO value associated with the corresponding input layout. The SLO module then generates or selects a proposed layout (the manner in which this is done is not germane to the technique introduced here) and uses its internal function(s) to generate an SLO value for the proposed layout. Additionally, the SLO module computes a steady-state cost for the input layout and proposed layout and a transition cost from the input layout to the proposed layout. Transition cost represents the amount and/or complexity of processing and data transfers needed to apply the input layout to the current topology of the data storage system (if the proposed layout is the same as the input layout, then the transition cost is zero). Steady-state cost represents the amount and/or complexity of processing and data transfers needed to continue to apply the proposed layout after the transition processing has been performed. These cost metrics can be computed by any known or convenient formula (s) or manner, the details of which are not germane to the technique introduced here. Nonetheless, as an example, if the input layout has a single copy of all data in the storage system, and the proposed new layout would apply three-way replication to all data in the storage system, then the replication SLO module might compute the new steady-state cost to be three times the current steady-state cost and the transition cost to be the processing and data transfer costs related to creating two additional replicas. As another example, if a proposed new layout would compress all data stored in the data storage system by a factor of 0.5, the compression SLO module might compute the new steady-state cost as 0.5 times the current steady-state cost, and the transition cost would be the processing required to perform the data compression.

Figure 5:
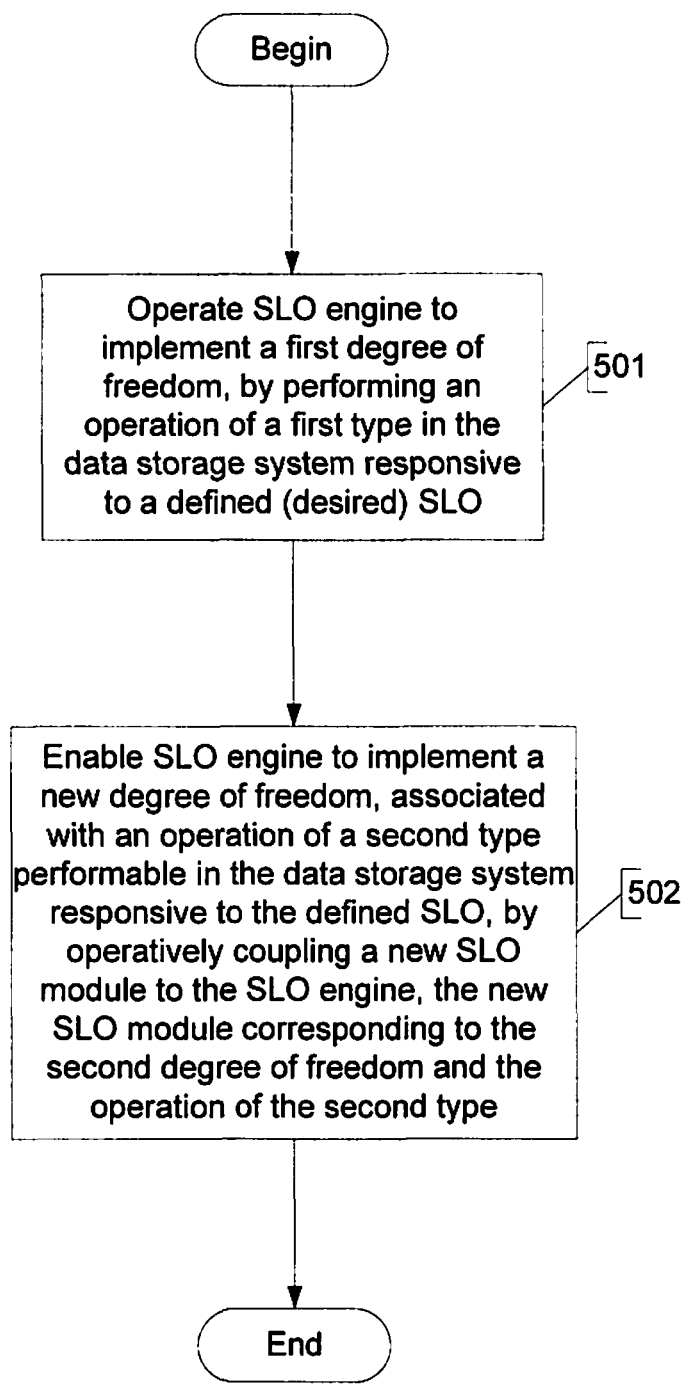
FIG. 5 is a flow diagram illustrating a process that can be performed in the SLO subsystem to add a degree of freedom.

FIG. 5 illustrates an example of a process of adding a degree of freedom to an SLO subsystem using the technique introduced here. The process initially includes, at step 501, operating the SLO engine 31 to implement a first degree of freedom, by performing an operation of a first type in the data storage system responsive to a defined (desired) SLO. The process further includes, at step 502, enabling the SLO engine 31 to implement a new degree of freedom, associated with an operation of a second type performable in the data storage system responsive to the defined SLO, by operatively coupling a new SLO module 33 to the SLO engine 31, where the new SLO module 33 corresponds to the second degree of freedom and the operation of the second type. The SLO engine 31 has no knowledge of the second degree of freedom or the operation of the second type prior to when the new SLO module is operatively coupled to the SLO engine 31.

Figure 6:
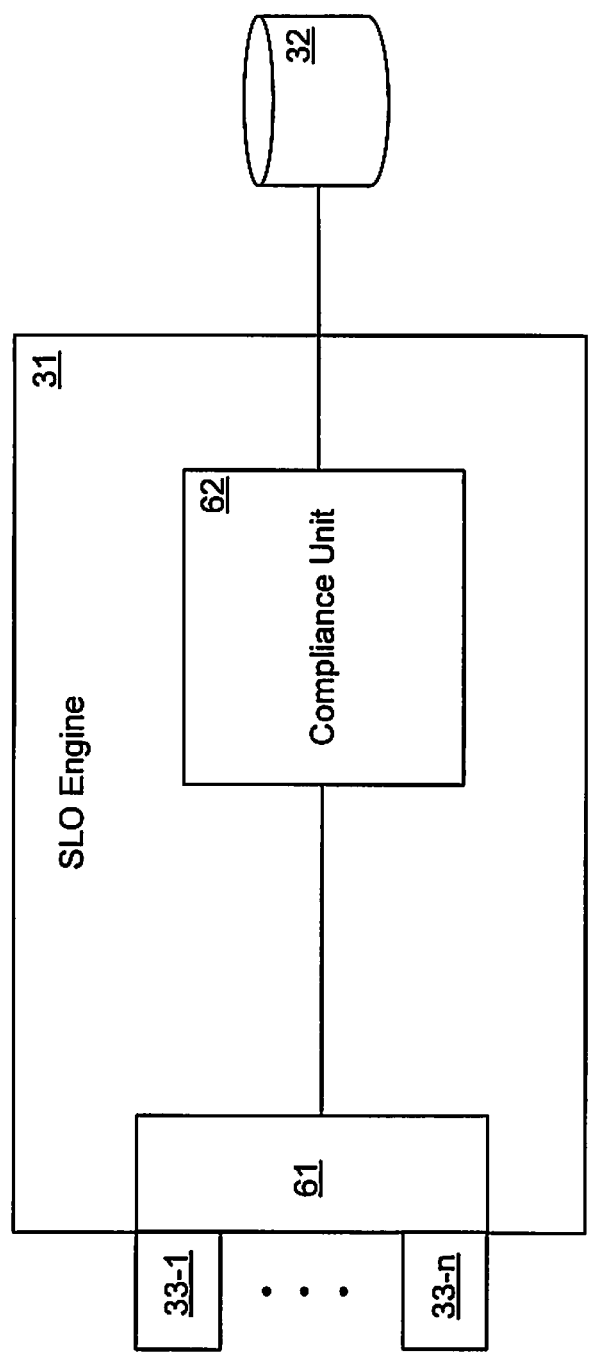
FIG. 6 illustrates an example of the SLO engine.

FIG. 6 illustrates the SLO engine 31 in greater detail, according to one embodiment. As shown, the SLO engine 31 includes an interface 61 and a compliance unit 62. The compliance unit 62 is responsible for controlling the overall operation of the SLO subsystem 11 and, as described further below, performs operations including generating and/or gathering input information to be provided to the SLO modules 33, ranking output arrays produced by the SLO modules 33, selecting the best output array from the output arrays produced by the SLO modules 33, and applying a layout associated with the selected output array to the data storage system 2 (or at least causing that to happen).

The interface 61 is designed so that new SLO modules 33 of essentially any number and for essentially any degrees of freedom can be plugged into (operatively coupled to) the SLO engine 31 to modify or increase its capability, without any need to modify the SLO engine 31 itself or the actual SLOs. The interface 61 provides a uniform communications interface between the SLO engine 31 and the SLO modules 33, so that each SLO module 33 only needs to be designed to comply with the interface in order to be compatible with the SLO engine 31. More specifically, in one embodiment the interface 61 provides, to each installed SLO module 33, the following inputs in the same format:

1) Input layout (typically, though not necessarily, the current layout; can include separate value for each of multiple layout characteristics, e.g., degree of replication, placement of replicas, transformation of replicas);

2) Current system topology (can include a separate value for each of multiple aspects of the topology, e.g., available storage systems, storage resources within each storage system, SLO and load characteristics of each storage resource, network connectivity, network resources available on network links, and available compute resources on each storage system);

3) Desired SLO (can be a vector that includes a separate value for each of multiple SLO characteristics, e.g., latency, throughput, corruption protection).

The input layout represents a state of the data storage system relative to the applicable degrees of freedom and can be, for example, the current layout of the data storage system. For example, the input layout can include values that indicate, for example: the degree of compression that is used (if any) and/or the data sets, types or tiers to which the compression is applied; the degree of replication that is used (if any) and the data sets, types or tiers to which the replication applies; the degree of encryption that is used (if any) and the data sets, types or tiers to which the encryption applies; the placement of data among volumes, LUNs, or tiers; etc.

The methodology by which these values are computed is unimportant, as long as it is used consistently. Likewise, the specific format in which these inputs are expressed and provided to the SLO modules is not important, as long as it is used for all SLO modules and is used consistently. Nonetheless, in the case of layout, various numeric or alphanumeric codes or values can be predefined for different layout characteristics, and used to represent the different possible variations of that characteristic. The same can be done for topology. The SLO can include one or more numeric values within a predefined range, such as 0 to 100.

Similarly, the interface 61 is designed to receive the same types of outputs from each SLO module 33. More specifically, in one embodiment the interface 61 receives from each installed SLO module 33 at least one output containing the following information:

1) Proposed layout (can include separate value for each of multiple layout characteristics, e.g., degree of replication, placement of replicas, transformation of replicas);

2) SLO for the proposed layout;

3) Difference between the desired SLO and the SLO for the proposed layout;

4) Transition cost associated with the proposed layout;

5) Steady-state cost associated with the proposed layout.

A proposed layout generated by an SLO module 33 can be a relatively simple indication; for example, a proposed layout from a compression module might be an indication stating in effect, "compress the data." Alternatively, a proposed layout can be more specific, such as an indication to the effect of "compress all data associated with volumes X and Y on storage system Z". As another example, a proposed layout from a data placement module might indicate that certain files or volumes should be moved from one particular tier to another. A data encryption module might specify, for example, that a particular type of encryption should be applied to the data storage system as a whole or to specific data sets, types or tiers.

As with the inputs, the particular methodology and format used to generate and communicate these outputs are unimportant as long as they are used consistently across all SLO modules. Each SLO module 33 knows how changing its applicable degree of freedom will affect the layout; for example, compressing changes the layout, adding a new replica changes the layout, etc. How the layout is changed by any given SLO module 33 (i.e., the proposed layout) in response to any given set of inputs is dependent on the logic within that SLO module, which in turn is dependent on the degree of freedom to which that SLO module relates. Such details are not germane to the technique introduced here.

Figure 7:
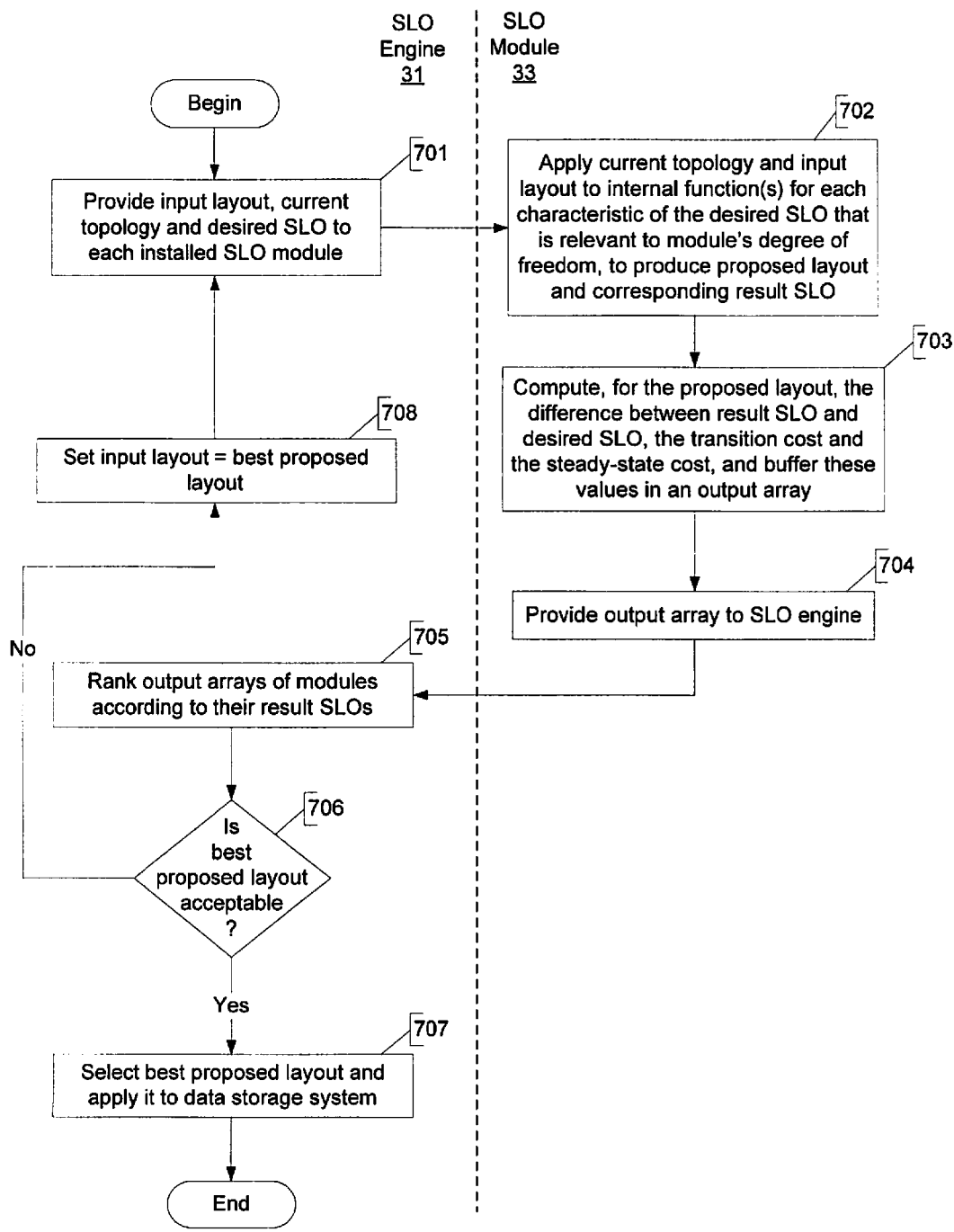
FIG. 7 is a flow diagram showing an example of a process that can be performed by the SLO engine and SLO modules to achieve SLO compliance.

FIG. 7 illustrates an example of the operation of the SLO subsystem 11 to achieve SLO compliance. The illustrated process is performed cooperatively by the SLO engine 31 and each installed SLO module 33. Initially, at step 701 the SLO engine 31 provides one or more input layouts (including at least the current layout), the current topology and the desired SLO to each of the installed SLO modules 33.

Accordingly, at step 702, each SLO module 33 applies the input current topology and each input layout to its internal function(s) (as described above in relation to FIGS. 4A through 4C), for each characteristic of the desired SLO that is relevant to that module's degree of freedom. The output of this step includes at least one proposed layout and a corresponding SLO value. If the output of this step includes more than one proposed layout, then this step in one embodiment includes separately applying each proposed layout to the module's internal function(s) to compute a result SLO, which can later be used to identify the proposed layout associate with the best result SLO. Note that the proposed layout generated by an SLO module can be the current layout, such as when making any change to the current layout would result in a reduced result SLO value. Also, if a particular SLO module is designed with knowledge of two or more SLO characteristics (e.g., efficiency and data protection), then this step in one embodiment also includes, for each proposed layout, applying the results of two or more intermediate functions to a composite function that collectively represents all of those SLO characteristics, as described above in relation to FIG. 4C.

At step 703 each SLO module 33 computes, for the proposed layout(s), the difference between the result SLO and the desired SLO, the transition cost and the steady-state cost, and then buffers these values, the proposed layout(s) and the associated SLOs in an output array. At step 704 each SLO module 33 provides its output values to the SLO engine 31.

At step 705 the SLO engine 31 ranks the output arrays from the SLO modules 33 by the SLOs of their proposed layouts. If at step 706 the ranked results include at least one acceptable proposed layout (e.g., if the corresponding SLO in at least one of the output arrays meets or exceeds the desired SLO), then at step 707 the SLO engine 31 can select the proposed layout with the best SLO, transition cost and steady-state cost, and apply it (or cause another system component to apply it) to the data storage system 2. If no output array includes an acceptable proposed layout (e.g., if none of the corresponding SLOs meets or exceeds the desired SLO), then the above-mentioned process can be iterated one or more additional times, wherein the best proposed layout or layouts from the previous iteration is/are used as the new input layout(s) to the various SLO modules 33, in order to converge upon a layout solution that complies with the desired SLO. In that case, at step 708 the SLO engine 31 sets the input layout(s) to be equal to the best layout(s) from the ranked output arrays, and the process then loops back to step 701 and repeats with this modified input set. Optionally, even if one or more proposed layouts are acceptable, the process can be reiterated in this way to find a layout that is more optimal across multiple degrees of freedom.

When the above process is performed iteratively (e.g., to find an acceptable solution or to find a better solution), the mathematical technique of "hill climbing" can be employed. Hill climbing is an iterative algorithm that starts with an arbitrary solution to a problem and then attempts to find a better solution by incrementally changing a single element of the solution. If the change produces a better solution, an incremental change is made to the new solution, and the process is repeated one or more times until no additional improvement can be found. Hill climbing generally is well-suited to finding a local optimum. It attempts to maximize (or minimize) some target function, f(x), where x is a vector of values. During each iteration, hill climbing adjusts one element in x and determines whether the change improves the value of f(x). Any change that improves f(x) is accepted, and the process continues until no change can be found to improve the value of f(x). The vector x is then considered to be locally optimal. In discrete vector spaces, every possible value for x can be represented as a vertex in a graph. Hill climbing follows the graph from one vertex to another, always locally increasing (or decreasing) the value of f(x) until a local maximum (or local minimum) for x is found.

Applying this principle to the technique introduced here, hill climbing might be used if, for example, the best result SLO approached but did not reach the desired SLO with the first iteration, or if it was desired to explore other "hills" (local maxima) that may only be reachable by moving in a sub-optimal direction (such as compressing the object, then replicating it, which has a lower transition cost and steady-state cost in comparison to replicating the object and then compressing it).

Consider now the following example of how the above-described process can be employed. For simplicity we assume for this example that there is only one SLO characteristic to be optimized: data protection. We further assume for this example that the SLO subsystem 11 has the following four SLO modules 33 installed:

Module 1: Data mirroring
Module 2: Data (geographic) dispersion
Module 3: Data compression
Module 4: Data replication Additionally, we assume further that:
1) The current layout of the data storage system (the input layout) has an SLO value of 10;
2) Current steady-state cost of the current layout equals 132;
3) Desired SLO equals 40.

The four SLO modules run their respective internal functions according to the process described above (regarding FIG. 7) and produce an array of one-dimensional output arrays. Assume those vectors contain the following values:

Module 1 output array: Resulting SLO=62 (+12), steady-state cost=292, transition cost=102;
Module 2 output array: Resulting SLO=82 (+42), steady state cost=183, transition cost=2523;
Module 3 output array: Resulting SLO=32 (−8), steady state cost=32, transition cost=1293;
Module 4 output array: Resulting SLO=71 (+31), steady state cost=169, transition cost=169.

For simplicity, the proposed layouts are not shown here, although they would also be indicated in the output array in one embodiment. It can be seen that each of the SLO modules in this example recommended (in effect) a change to the layout, and the proposed layouts from Modules 1, 2 and 4 all exceed the desired SLO; thus it is not necessary to optimize further (e.g., by iteration). In one embodiment, the SLO engine 31 can simply take the proposed layout that has the highest SLO, in this case, the proposed layout from Module 2. Alternatively, the SLO engine 31 can rank these output arrays by steady-state cost and/or transition cost. For example, if the current topology is lacking in compute resources, then the SLO engine 31 may optimize based on transition cost (e.g., by selecting the layout that has the lowest transition cost of those layouts that have an acceptable SLO). Similarly, if the current topology has sufficient compute resources, the SLO engine 31 may instead optimize based on steady-state cost.

In this example, let us assume that the data storage system 2 has available sufficient compute resources. This produces the following ranking of the SLO module's output array:

1) Output array from Module 4
2) Output array from Module 2
3) Output array from Module 1
4) Output array from Module 3

At this point the SLO engine 31 can either select the proposed layout from Module 4 and make that the new desired layout for stored data objects, or it can iterate by running Module 4's proposed layout (or any other proposed layout) through the above process as the new input layout (e.g., using hill climbing).

If there are multiple SLO characteristics to be optimized, two or more of them may conflict. In that event, it may be necessary to find a balance between different SLO characteristics. For example, a security SLO may restrict the layout to encrypted disks but not allow the data protection SLO to be met if there is, for example, only one location with encrypted disks. In that case, the SLO engine 31 can flag that the desired SLO cannot be achieved, indicate why, and let the storage administrator determine the best solution.

Figure 8:
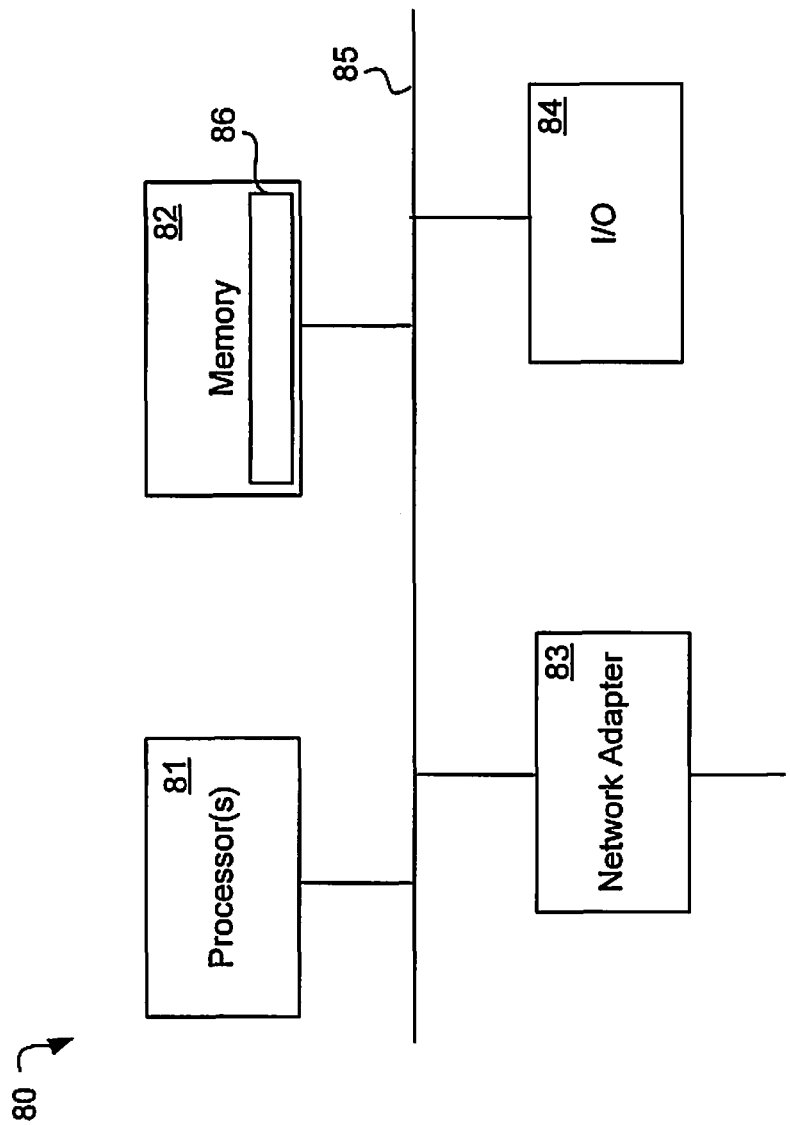
FIG. 8 is a high-level block diagram of a processing system that can represent any of the processing systems shown in FIG. 1.

FIG. 8 is a high-level block diagram showing an example of a processing system 80 that can embody of any of the devices mentioned above, such as the storage server 4, the management station 9 or a client system 1. In the illustrated embodiment, the processing system 80 includes a processor subsystem 81 that includes one or more processors. The processing system 80 further includes a memory 82, a network adapter 83, and one or more input/output (I/O) devices 84, all interconnected by an interconnect 85.

The memory 81 includes storage locations that are addressable by the processor(s) in the processor subsystem 81 and can store code 86 (i.e., software and/or firmware instructions and data structures) associated with the technique produced here. The processor(s) in the processor subsystem 81 may be or include, for example, one or more general-purpose or special-purpose programmable microprocessors, application-specific integrated circuits (ASICs), programmable logic devices (PLDs), field programmable gate arrays (FPGAs), or the like.

The network adapter 83 includes a plurality of ports to couple the processing system 80 to one or more other processing system over one or more point-to-point links, WANs, LANs, or a global network such as the Internet. The network adapter 83 thus can include mechanical components and electrical circuitry needed to connect the processing system to a network.

If the processing system 80 is a storage server, then it may also include a storage adapter (not shown) through which to access a set of one or more external mass storage devices, such as disk, tapes or solid-state drives (SSDs). If the processing system 80 is an end-user device (e.g., a client system), then the I/O devices 84 may include, for example, a display device, a keyboard, mouse, microphone, speakers, etc.

The techniques introduced above can be implemented by programmable circuitry that is programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A service level objective (SLO) engine comprising:
an interface by which the SLO engine can communicate with a plurality of modules that are functionally distinct from each other and the SLO engine, each of the modules designed to evaluate a different one of a plurality of degrees of freedom of a data storage system in relation to any specified SLO and to produce a corresponding result; and
a compliance unit to determine, based on the results produced by the modules, one or more operations to perform on the data storage system in one or more of the plurality of degrees of freedom to increase a degree to which a specified SLO is satisfied;
wherein the compliance unit is configured to determine the one or more operations to perform on the data storage system by executing a process that includes:
ranking the results from the modules; and
selecting a proposed layout in one of the ranked results to apply to the data storage system.

2. An SLO engine as recited in claim 1, wherein the interface enables the SLO engine to communicate with an arbitrary number of said modules, where each of the modules is designed to evaluate a different degree of freedom in relation to an arbitrary SLO.

3. An SLO engine as recited in claim 2, wherein the result produced by each of the modules includes a proposed layout.

4. An SLO engine as recited in claim 3, wherein the result produced by each of the modules includes an indication of a degree to which the proposed layout will satisfy the specified SLO.

5. An SLO engine as recited in claim 4, wherein the indication comprises an SLO value associated with the proposed layout.

6. An SLO engine as recited in claim 3, wherein the result produced by each of the modules further includes a steady-state cost and a transition cost associated with the proposed layout.

7. An SLO engine as recited in claim 1, wherein the compliance unit causes a plurality of proposed layouts received from the modules to be processed iteratively by the plurality of modules to converge towards an optimal layout and ranking.

8. An SLO engine as recited in claim 1, wherein the interface is configured to provide to each of the modules SLO data indicative of the specified SLO and a current layout of the data storage system.

9. An SLO engine as recited in claim 1, wherein at least one module of the plurality of modules is from the group consisting of:

a data mirroring module to control data mirroring in relation to a specified SLO;
a data placement module to control data placement in relation to a specified SLO;
a namespace placement module to control data access in relation to a specified SLO;
a data replication module to control data replication in relation to a specified SLO;
a data caching module to control data caching in relation to a specified SLO;
a data transformation module to control data transformation, including encryption or compression or both, in relation to a specified SLO; and
a data dispersion module to control geographic dispersion of data in relation to a specified SLO.

10. A service level objective (SLO) subsystem for use in a data storage system, the SLO subsystem comprising:
a database to store SLO data defining an SLO; and
an SLO engine to implement a first degree of freedom according to the SLO by performing a first defined operation in the data storage system responsive to the SLO data, the SLO subsystem being configurable to implement, without requiring modification of the SLO engine or the SLO, a new degree of freedom associated with a second operation that is performable in the data storage system responsive to the SLO, wherein the SLO engine has no knowledge of the new degree of freedom or the new operation before the SLO subsystem is configured to provide the new degree of freedom, the SLO engine including an interface capable of communicating with an arbitrary number of external modules, each of which is designed to evaluate a different degree of freedom in relation to any arbitrary SLO.

11. An SLO subsystem as recited in claim 10, wherein each said module is designed independently of the arbitrary SLO.

12. An SLO subsystem as recited in claim 10, wherein each said module is configured to:
input data indicative of a specified SLO and a current layout of the data storage system;
apply the data to a function that represents a relationship between an SLO characteristic and a degree of freedom represented by the module, to determine an output set that indicates a proposed layout and an SLO value for the proposed layout; and
provide the output set to the SLO engine.

13. An SLO subsystem as recited in claim 12, wherein the output set further includes a steady-state cost and a transition cost associated with the proposed layout.

14. An SLO subsystem as recited in claim 13, wherein the SLO engine is configured to receive the output set from each of a plurality of said modules, and to determine, based on the output sets from the plurality of said modules, an action designed to increase the overall degree to which the SLO is satisfied.

15. An SLO subsystem as recited in claim 10, wherein the new degree of freedom is from the group consisting of:
data mirroring;
data placement;
data access control;
data replication;
data caching;
data transformation; and
data geographic dispersion.

16. A processing system comprising:
a processor;
a memory coupled to the processor;
a plurality of modules, each representing a different degree of freedom of a data storage system; and
an SLO engine, operatively coupled to but functionally distinct from each of the modules, to provide to each of the modules SLO data indicating a desired SLO for the data storage system and state data representing a current state of data stored in the data storage system, to receive from each of the modules a separate output array that includes a proposed layout and an SLO value associated with the proposed layout, the SLO engine including an interface capable of communicating with an arbitrary number of external modules, each of which is designed to evaluate a different degree of freedom in relation to any arbitrary SLO.

17. A processing system as recited in claim 16, wherein the SLO value received from each of the modules represents a degree to which the proposed layout will satisfy an SLO characteristic in a degree of freedom represented by the corresponding module.

18. A processing system as recited in claim 17, wherein the SLO engine further is to select, based on the output values, a proposed layout to apply to the data storage system to increase the degree to which the desired SLO is satisfied.

19. A processing system as recited in claim 16, wherein each of the plurality of modules is designed to evaluate a particular degree of freedom in relation to an arbitrary SLO.

20. A processing system as recited in claim 16, wherein at least one module of the plurality of modules is from the group consisting of:
a data mirroring module to control data mirroring in relation to a specified SLO;
a namespace placement module to control data access in relation to a specified SLO;
a data placement module to control data placement in relation to a specified SLO;
a data replication module to control data replication in relation to a specified SLO;
a data caching module to control data caching in relation to a specified SLO;
a data transformation module to control data transformation, including compression or encryption or both, in relation to a specified SLO; and
a data dispersion module to control geographic dispersion of data in relation to a specified SLO.

21. A method comprising:
operating a service level objective (SLO) engine in a data storage system to implement a first degree of freedom, by performing an operation of a first type in the data storage system responsive to a defined SLO; and
enabling the SLO engine to implement a new degree of freedom associated with an operation of a second type performable in the data storage system responsive to the defined SLO, by operatively coupling a functional module to the SLO engine, the functional module corresponding to the second degree of freedom and the operation of the second type, wherein the functional module is designed with specific knowledge of the second degree of freedom but with no knowledge of the SLO and is designed to evaluate the second degree of freedom in relation to any arbitrary SLO, wherein the SLO engine has no knowledge of the second degree of freedom or the operation of the second type prior to when the functional module is operatively coupled to the SLO engine.

22. A method as recited in claim 21, wherein the second degree of freedom is from the group consisting of:
data mirroring;
data placement;

data access control;
data replication;
data caching;
data transformation; and
data geographic dispersion.

23. A method comprising:
providing, to each of a plurality of functional modules, service level objective (SLO) data indicative of a specified SLO for a data storage system and state data indicative of a current state of the data storage system, each of the functional modules corresponding to a different one of a plurality of degrees of freedom, each of the functional modules configured to apply the SLO data and the state data to a function that represents a particular relationship between an SLO characteristic and the corresponding degree of freedom, wherein each of the functional modules is designed with specific knowledge of the degree of freedom but with no knowledge of the SLO and is designed to evaluate the degree of freedom in relation to any arbitrary SLO;
receiving from each said functional module an output set that includes a layout for the data storage system and an indication of a degree to which the layout will satisfy the specified SLO; and
selecting a layout to apply to the data storage system based on the output sets from the plurality of functional modules.

24. A method as recited in claim 23, wherein the indication received from each said functional module represents a degree to which the corresponding layout will satisfy an SLO characteristic in a degree of freedom represented by the corresponding functional module.

25. A method as recited in claim 24, wherein selecting a layout to apply to the data storage system comprises:
ranking the layouts received from the plurality of functional modules; and
selecting one of the ranked layouts to apply to the data storage system.

26. A method as recited in claim 24, wherein the layouts received from the plurality of functional modules are iteratively processed multiple times by the plurality of functionality modules to converge towards an optimal layout and ranking.

27. A method as recited in claim 23, wherein each of the plurality of functional modules is designed independently of the specified SLO.

28. A method as recited in claim 23, wherein at least one degree of freedom from the plurality of degrees of freedom is from the group consisting of:
data mirroring;
data placement;
data access control;
data replication;
data caching;
data transformation; and
data geographic dispersion.

* * * * *

UNITED STATES PATENT AND TRADEMARK OFFICE
CERTIFICATE OF CORRECTION

PATENT NO.         : 8,700,806 B1                                            Page 1 of 1
APPLICATION NO.    : 13/033531
DATED              : April 15, 2014
INVENTOR(S)        : Slik et al.

It is certified that error appears in the above-identified patent and that said Letters Patent is hereby corrected as shown below:

On the Title Page

On page 1, in column 2, Item [56], under "U.S. Patent Documents", line 5, delete "2010/0186963" and insert -- 2010/0185963 --, therefor.

On page 1, in column 2, Item [56], under "U.S. Patent Documents", line 5, delete "Butcher" and insert -- Slik et al. --, therefor.

Signed and Sealed this
Twenty-ninth Day of July, 2014

Michelle K. Lee
*Deputy Director of the United States Patent and Trademark Office*